(12) United States Patent
Ogura

(10) Patent No.: US 6,786,523 B2
(45) Date of Patent: Sep. 7, 2004

(54) DRAWER APPARATUS IN VEHICLE

(75) Inventor: Mitsuo Ogura, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/407,255

(22) Filed: Apr. 7, 2003

(65) Prior Publication Data
US 2003/0197398 A1 Oct. 23, 2003

(30) Foreign Application Priority Data

Apr. 10, 2002 (JP) ..................................... P2002-107501

(51) Int. Cl.[7] ............................................... B60N 3/10
(52) U.S. Cl. ................ 296/24.34; 296/37.12; 312/330.1; 224/483; 224/281; 224/926
(58) Field of Search .................... 296/24.34, 24.46, 296/37.1, 37.8, 37.9, 37.12, 37.15, 1.09; 312/330.1, 333; 224/400, 483, 277, 281, 926

(56) References Cited

U.S. PATENT DOCUMENTS

| 4,392,683 | A | * | 7/1983 | Bassi | 296/37.9 |
| 4,600,255 | A | * | 7/1986 | Dubarko | 312/333 |
| 4,792,174 | A | * | 12/1988 | Shioda | 296/37.12 |
| 5,228,611 | A | * | 7/1993 | Yabuya | 224/281 |
| 5,395,084 | A | * | 3/1995 | Ikuma | 248/311.2 |
| 6,042,168 | A | * | 3/2000 | Bieri | 296/37.12 |
| 6,253,975 | B1 | * | 7/2001 | Ichioka et al. | 224/281 |
| 6,450,468 | B1 | * | 9/2002 | Hamamoto | 248/311.2 |
| 6,513,687 | B1 | * | 2/2003 | Siniarski | 224/282 |

FOREIGN PATENT DOCUMENTS

| JP | H06-71309 | 10/1994 |
| JP | 2000-062512 | 2/2000 |
| JP | 2000-318533 | 11/2000 |

* cited by examiner

Primary Examiner—Patricia L. Engle
(74) Attorney, Agent, or Firm—Posz & Bethards, PLC

(57) ABSTRACT

A vehicular drawer apparatus includes a case installed in an interior member and a drawer member that slides in and out of the case. Energy absorption devices for absorbing impact energy applied to the drawer member in a drawn-out direction are disposed on at least one of the case and the drawer member. The energy absorption devices, which are engaged by a striker, are constructed to absorb impact energy in a stepped manner and to fail sequentially. Due to this, the energy absorption devices are not required to have a high strength. In addition, even in the event that a very large impact energy is applied to the drawer member, the energy can be absorbed.

7 Claims, 11 Drawing Sheets

DRAWER APPARATUS IN VEHICLE

The present application is based on Japanese Patent Application No. 2002-107501, the entire contents of which are incorporated herein by reference.

BACKGROUND OF THE INVENTION

1. Field of the Invention

The present invention relates to a drawer apparatus adapted to be disposed in an instrument panel or a rear center arm rest of a vehicle.

2. Related Art

A drawer apparatus for vehicle such as a cup holder or a storage compartment for small things (hereinafter, referred as "vehicular drawer apparatus") comprises a case and a drawer member. The case is installed in an interior member. The drawer member is disposed in such a manner as to slide in and out of the case. JP-A-2000-62512 discloses a vehicular drawer apparatus which can restrain the fall of a drawer member from a case when a large magnitude of impact energy is applied to the drawer member.

FIG. 12 shows a longitudinally sectional view of the vehicular drawer apparatus. As shown in the figure, a vehicular drawer apparatus 100 comprises a case 101 and a drawer member 102. In addition, the drawer member 102 comprises a reciprocating portion 103 and a rotating portion 104. FIG. 13 shows an enlarged view of a circled portion shown in FIG. 12. As shown in the figure, a first stopper 105 is provided in such a manner as to protrude downwardly from an upper bottom wall of the case 101. In addition, a second stopper 106 is provided in such a manner as to protrude upwardly from an upper bottom wall of the reciprocating portion 103. Furthermore, a projection 107 is provided in such a manner as to project upwardly from an upper bottom wall of the rotating portion 104.

When the drawer member 102 is drawn out of the case 101, the second stopper 106 comes into engagement with the first stopper 105 in the drawn-out direction. This position is the drawn-out position of the drawer member 102. Here, in the event that a large magnitude of impact energy is applied in the drawn-out direction, the second stopper 106 sinks under the first stopper 105, and there is caused a risk that the engagement between the first stopper 105 and the second stopper 106 fails, leading to a further risk that the drawer member is dislodged from the case 101.

However, at the drawn-out position, the projection 107 pushes up the second stopper 106 due to the rotation of the rotating portion 104. Namely, the second stopper 106 engages with the first stopper 105 while being supported by the projection 107 from below. Due to this, the risk that the second stopper 106 sinks under the first stopper 105 is small. Thus, in the vehicular drawer apparatus 100, the dislodgement of the drawer member 102 from the case 101 is restrained only by a locking mechanism comprising the first stopper 105 and the second stopper 106. In addition, impact energy is absorbed solely by the locking mechanism.

Incidentally, the impact energy absorption amount of the locking mechanism is obtained by a product of an impact energy F required for deformation and a deformation amount S. In the vehicular drawer apparatus 100 disclosed in the aforesaid Japanese Unexamined Patent Publication, the impact energy absorption amount E is secured by increasing the impact load F required for deformation. Due to this, the locking mechanism is required to have a relatively high strength. To be specific, a relatively high rigidity is required for engagement between the first stopper 105 and the second stopper 106. In addition, in order to restrain the disengagement of the two stoppers, the first stopper 105 and the second stopper 106 themselves need to be prepared of materials having relatively high Young's modulus. The vehicular drawer apparatus of the forgoing Japanese Unexamined Patent Publication becomes expensive due to these reasons. Additionally, in the event that an excessively large impact energy is applied to the drawer, it is difficult to absorb the whole impact energy only by the locking mechanism.

SUMMARY OF THE INVENTION

The invention has completed a vehicular drawer apparatus in view of the situations. Consequently, an object of the invention is to provide a vehicular drawer apparatus which can absorb energy even in the event that an excessively large impact energy is applied while no high strength is required.

(1) With a view to achieving the object, according to the invention, there is provided a vehicular drawer apparatus a vehicular drawer apparatus comprising a case installed in an interior member and a drawer member disposed in such a manner as to slide in and out of the case, the vehicular drawer apparatus being characterized in that at least one of the case and the drawer member has an energy absorption device for absorbing an impact energy applied to the drawer member in a direction in which the drawer member is drawn out while deforming the impact energy.

Namely, in the vehicular drawer apparatus according to the invention, the energy absorption device is disposed in at least one of the case and the drawer member. The impact load F required to deform the energy absorption device is set relatively low. In addition, the deformation amount S of the energy absorption device is set relatively large. Then, the required impact energy absorbing amount E is secured. In other words, the energy absorption device absorbs impact energy by deforming itself in a stepped manner.

The energy absorption device is preferred to deform easily to some extent. Due to this, the energy absorption device is required no high strength. Consequently, the vehicular drawer apparatus according to the invention becomes inexpensive. In addition, from the viewpoint of the structure of the vehicular drawer apparatus, it is relatively easy to secure a certain deformable area in the drawer member in a direction in which the drawer member is drawn out. Due to this, in the event that an excessively large impact energy is applied to the vehicular drawer apparatus, the whole impact energy can be absorbed when the energy absorption device is deformed sufficiently. Consequently, according to the vehicular drawer apparatus of the invention, a risk is small that the drawer member is dislodged from the case.

(2) Preferably, the energy absorption device is constructed as a graded energy absorption device which requires a small impact load to effect a deformation in an early impact stage and requires a large impact load to effect a deformation in a late impact stage. The graded energy absorption device is set so as to deform with ease in the early impact stage and then to deform gradually with difficulty as the impact applied becomes larger in the late impact stage. Here, in case the energy absorption device is difficult to deform in the early impact stage, the deceleration of the drawer member to the case becomes large. Namely, the drawer member that has started to move due to the impact is restricted by the energy absorbing member and decelerates drastically. This may cause a risk that a large impact load is momentarily applied to the drawer member and/or the case, whereby a defect is caused in the drawer member and/or the case.

In contrast, in case the energy absorption device is easy to deform in the early stage of impact, the deceleration of the drawer relative to the case becomes smaller. Consequently, according to the construction, the drawer member and the case can be protected against impact.

(3) Preferably, the energy absorption device may be constructed as a buckling device for absorbing an impact energy through buckling failure. The bucking device absorbs impact energy by allowing the buckling device itself to buckle and fail when an impact is applied thereto. According to the construction, impact energy can be absorbed in a stepped manner by suitably adjusting the size, number and configuration of the buckling device. Additionally, the absorbing amount of impact energy can be adjusted.

(4) Preferably, the energy absorption device may be constructed as a crushing device for absorbing an impact energy through compression failure. The crushing device absorbs impact energy by allowing the crushing device itself to be crushed at the time of impact. According to the construction, impact energy can be absorbed in a stepped manner by suitably adjusting the size, number and configuration of the crushing device. Additionally, the absorbing amount of impact energy can be adjusted. Furthermore, a relatively large crushable zone can be secured by disposing the crushing device. In other words, it is easy to set such that the whole of the crushing device crushes uniformly. Due to this, according to the invention, impact energy can be absorbed effectively.

(5) Preferably, the energy absorbing deice may be constructed as a plurality of projections disposed in the case, wherein the drawer member has a striker which aligns with the plurality of projections in the drawn-out direction, and wherein when an impact energy is applied to the drawer member the striker causes the plurality of projections to fail sequentially so that the impact energy so applied to the drawer member is absorbed in a stepped manner. Namely, according to the construction, the striker disposed on the drawer member causes the projections disposed in the case to fail sequentially to there by absorb impact energy. According to the construction, impact energy can be absorbed in a stepped manner with the relatively simple construction.

(6) Preferably, the projection that is the closest to the striker among the plurality of projections is served to determine the drawn-out position of said drawer member. In other words, according to the construction, the determination of the drawn-out position of the drawer member is effected by the positioning projection which is one of the projections. In the event that impact energy is equal to or lower than a predetermined value, the positioning projection does not fail even if the striker comes into to abutment therewith. As this occurs, the positioning projection is used to determine the drawn-out position of the drawer member. In contrast, in the event that impact energy exceeds the predetermined value, the positioning projection fails when the striker comes into abutment therewith. As this occurs, the positioning projection is used to absorb the impact energy. According to the construction, the positioning projection functions not only to determine the position of the drawer member but also to absorb impact energy. Due to this, there is no need to dispose separately a member for positioning the drawer member. Consequently, according to the construction, the number of components does not have to be large.

DETAILED DESCRIPTION OF THE PREFERRED EMBODIMENTS

Embodiments of a vehicular drawer apparatus according to the invention will be described below.

(1) First Embodiment

Figure 1:
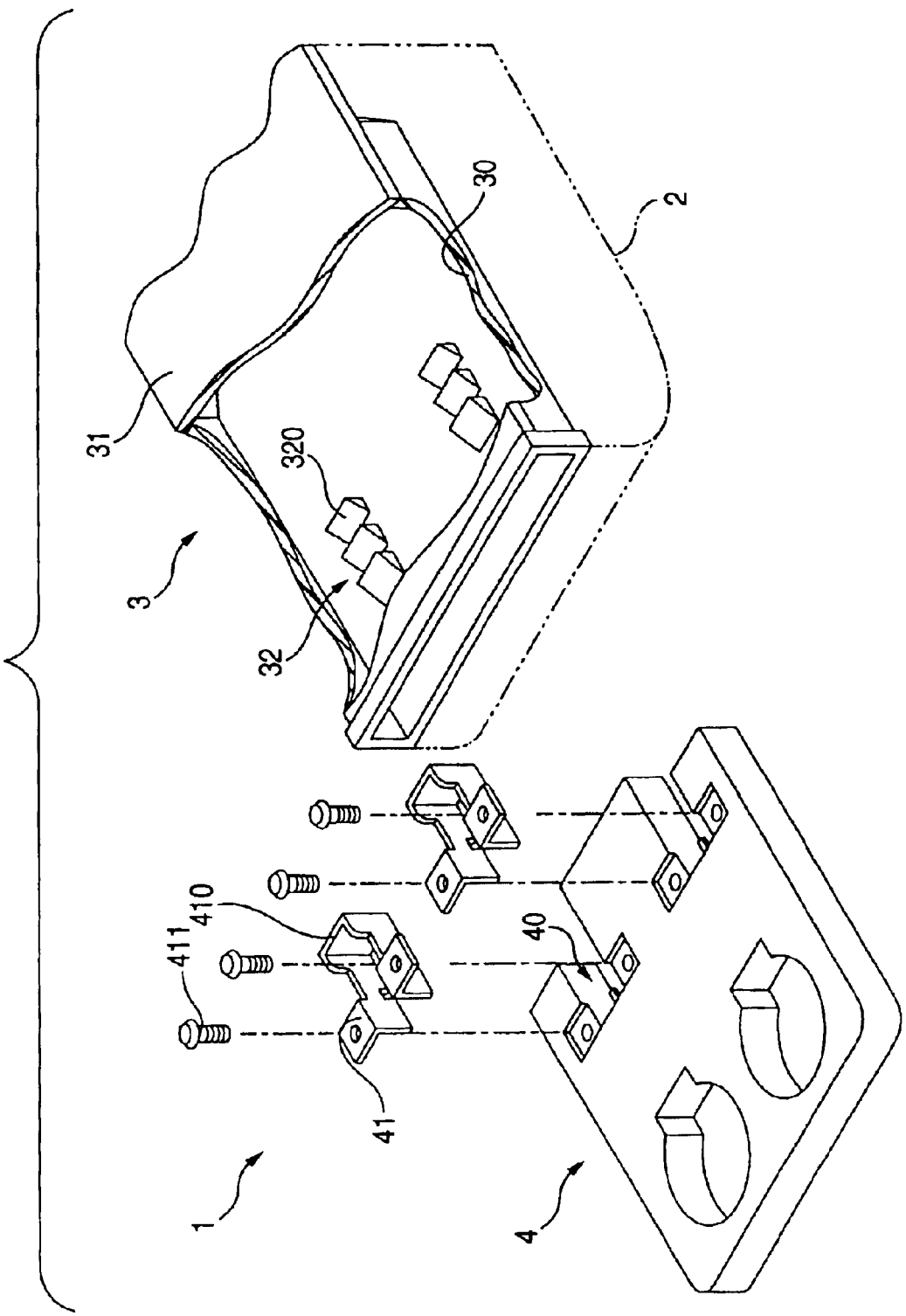
FIG. 1 is an exploded view of a vehicular drawer apparatus according to a first embodiment of the invention.

Firstly, the construction of a vehicular drawer apparatus according to the first embodiment will be described. An exploded view showing the vehicular drawer apparatus according the embodiment is shown in FIG. 1. As shown in the figure, the vehicular drawer apparatus 1 is installed in a rear center arm rest 2 (shown by double-dashed lines in the figure). Note that the rear center arm 2 is included in the interior member of the invention.

The vehicular drawer apparatus 1 comprises a case 3 and a cup holder 4. Note that the cup holder 4 is included in the drawer member of the invention. The case 3 comprises a box portion 30 and a top plate portion 31. The box portion 30 is made of resin and opens forward and upward. The box portion 30 is installed in the rear center arm rest 2. Failing projections 32 are provided on an upper surface of a bottom wall of the box portion 30 integrally in such a manner as to protrude therefrom. The failing projection 32 takes the form of a triangle which points forward. Three such failing projections 32 are disposed in line in a direction in which the cup holder 4 is drawn out or in a longitudinal direction. In addition, two rows of failing projections 32 are aligned in a transverse direction. Namely, a total of six failing projections 32 are disposed. In addition, among these six failing projections, the rearmost two failing projections 32 are caused to function as positioning projections 320. The top plate portion 31 is also made of resin and takes the form of a rectangle. The top plate portion 31 is disposed to cover the upper opening of the box portion 30.

The cup holder 4 is made of resin and is formed into the shape of a rectangular tray which opens downward. A slit 40 is formed in the cup holder 4 in such a manner as to extend forward from a rear end wall thereof. Totally, two slits 40 are formed in parallel in the transverse direction. In addition, the two slits 40 are opposed to the aforementioned two rows of the failing projections respectively. A striker 41 is disposed for each of the slits 40. Namely, totally two strikers are disposed. Then, the strikers 41 also align with the two rows of failing projections 32 in the longitudinal direction. A stopper blade portion 410 formed of a rectangular plate is formed at the center of a U-shaped portion of the striker 41. The strikers 41 are fixed to the cup holder 4 with screws 411 as illustrated by chained lines in the figure.

Figure 2:
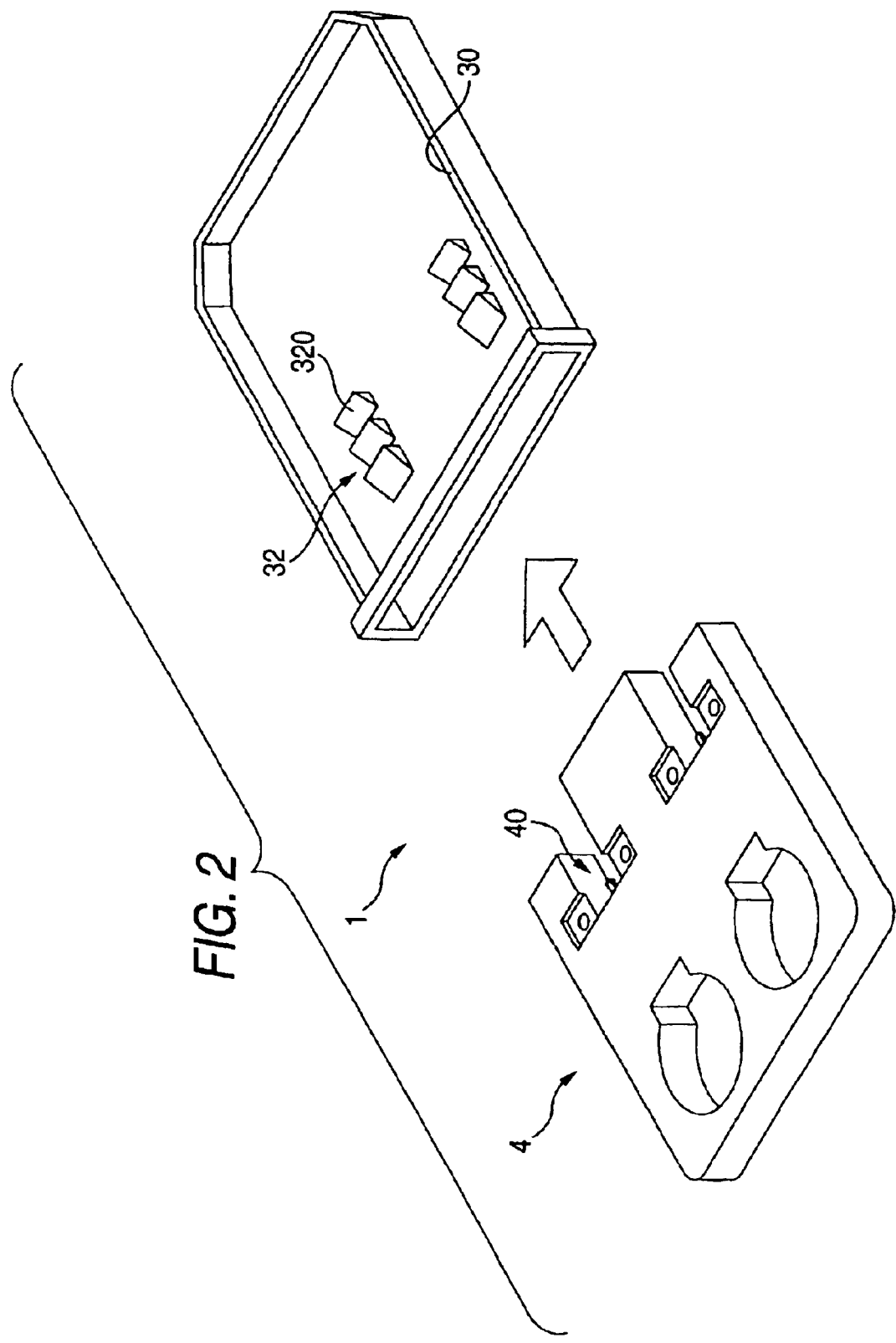
FIG. 2 is a diagram showing a first half of a fabrication process of the vehicular drawer apparatus according to the first embodiment.

Next, a fabricating process of the vehicular drawer apparatus according to the embodiment will be described. In fabricating the drawer apparatus, firstly, as shown in FIG. 2, a cup holder 4 and a box portion 30 are prepared through injection molding, respectively. As this occurs, failing projections 32 are prepared at the same time as the box portion 30 is prepared. Then, as shown by an arrow in the figure, the cup holder 4 is inserted into the box portion 30.

Figure 3:
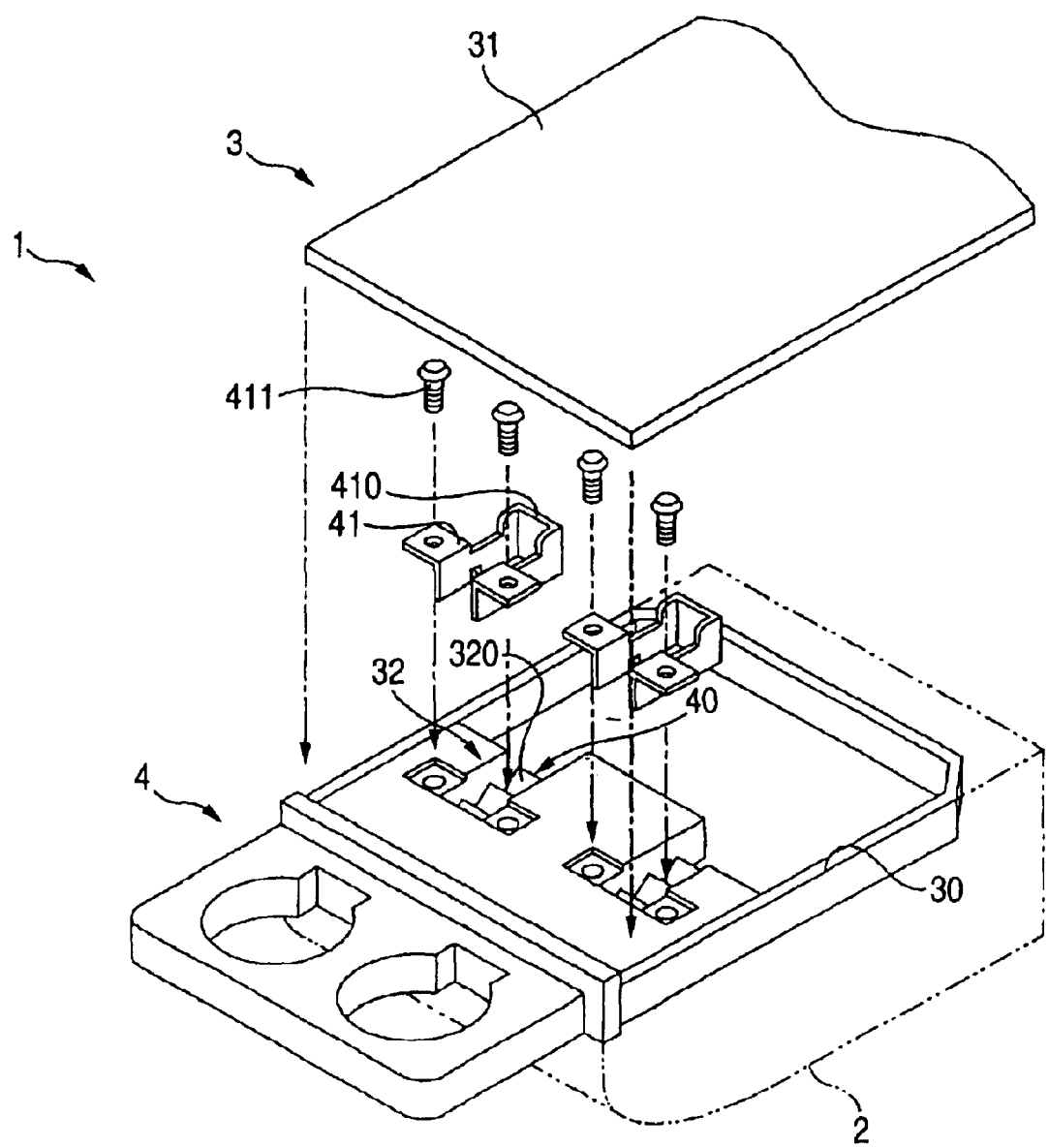
FIG. 3 is a diagram showing a latter half of a fabrication process of the vehicular drawer apparatus according to the first embodiment.

As shown in FIG. 3, the cup holder 4 continues to be inserted until two rows of failing projections 32 enter the two slits 40 completely. Following this, as shown by chained lines in the figure, the strikers 41 are fixed to the cup bolder 4 with screws 411. As this occurs, the stopper blade portions 410 are disposed rearward of the positioning projections 320, respectively. Then, the box portion 30 is fixed to the rear center arm rest 2. Finally, the top plate portion 31 is fixed to the box portion 30 in such a manner as to be placed over the upper opening of the box portion 30. Thus, the vehicular drawer apparatus according to the first embodiment is fabricated.

Figure 4:
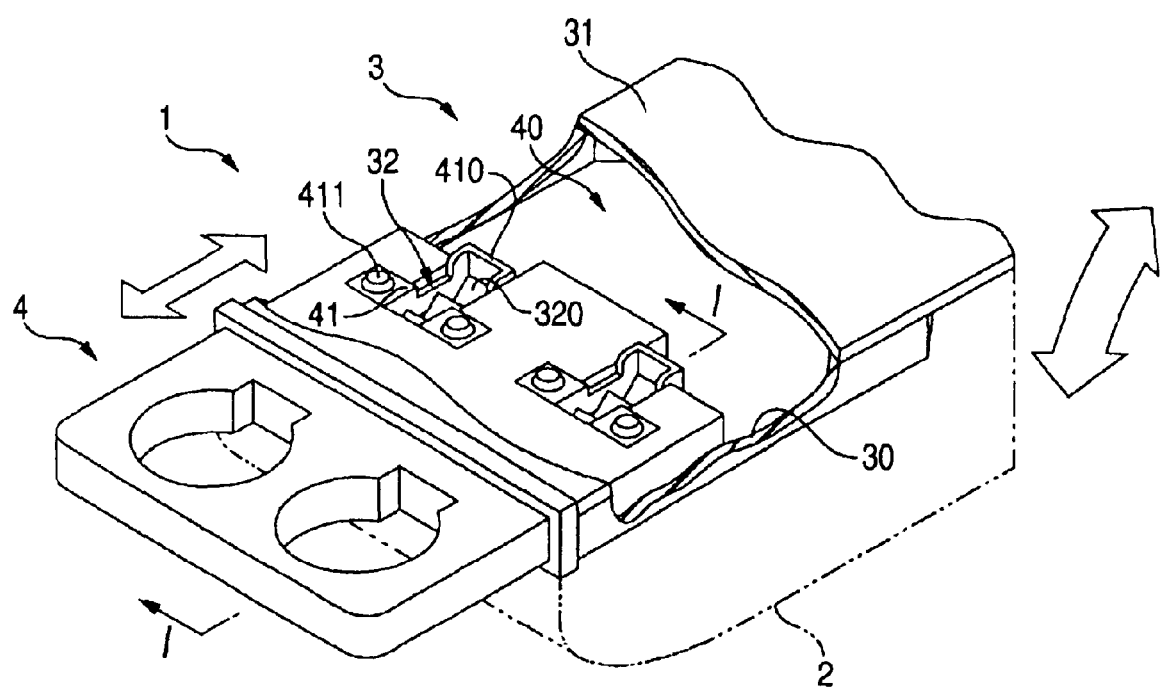
FIG. 4 is a diagram showing the incorporation of constituent members into the vehicular drawer apparatus according to the first embodiment.

Next, slid-in and slide-out operations of the cup holder of the vehicular drawer apparatus according to the embodiment will be described. FIG. 4 shows a diagram showing the vehicular drawer apparatus in which the cup holder 4 is incorporated in the case 3 which is installed in the rear center arm rest. As shown by arrows in the figure, the cup holder 4 is allowed to slide in and out of the case 3 in the longitudinal direction. In addition, the rear center arm rest 2 is allowed to swivel through substantially 90° in the longitudinal direction, as shown by arrows in the figure.

Figure 5:
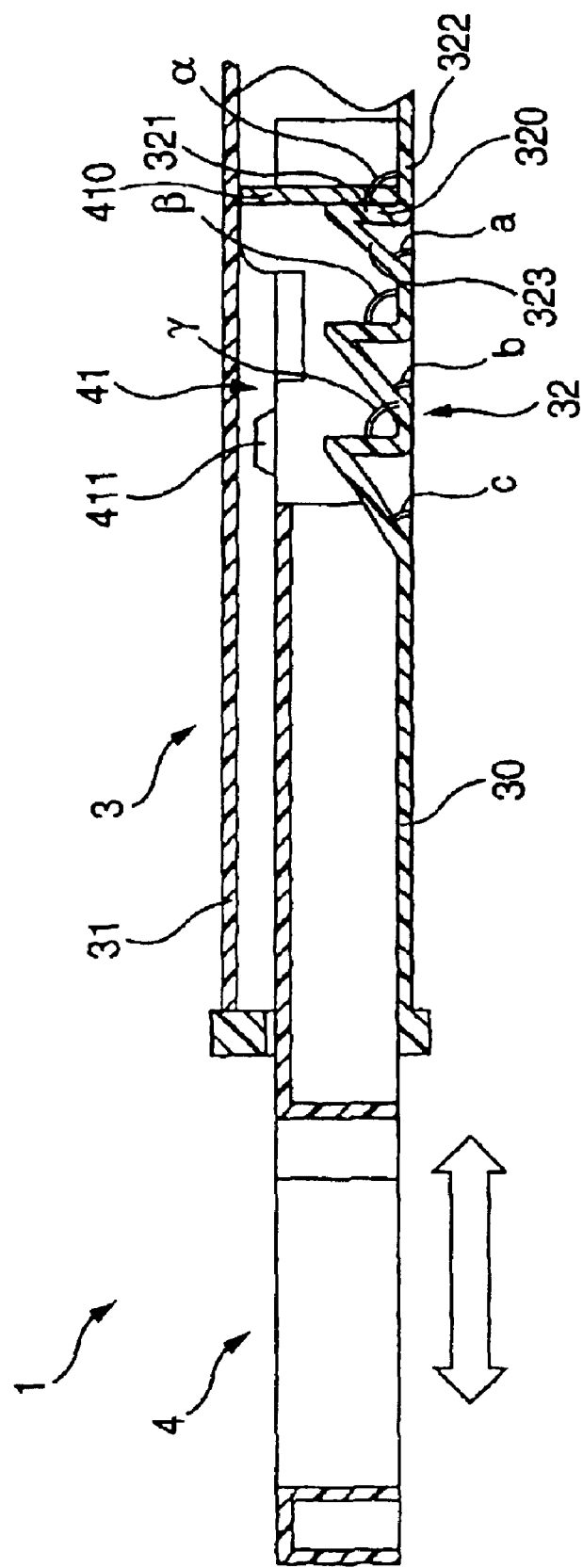
FIG. 5 is a sectional view taken along the line I—I of FIG. 4.

A sectional view taken along the line I—I in FIG. 4 is shown in FIG. 5. As shown, a front end face of the stopper blade portion 410 is in abutment with a rear end face of the positioning projection 320, which is one of the failing projections 32, at the drawn-out position. Then, an amount in which the cup holder 4 is drawn out is determined by this abutment.

In addition, included angles formed by erect walls 321 and bottom walls 322 of the three failing projections 32 arranged in the longitudinal direction are set such that the included angle of the positioning projection 320 is the smallest, that of the central failing projection 32 medium, and that of the front-most failing projection 32 the largest. In other words, the included angles of those failing projections are set to have the following relationship in the figure; $\alpha<\beta<\gamma$. In addition, included angles formed by inclined walls 323 and the bottom walls 322 of the three failing projections 32 arranged in the longitudinal direction are set such that the included angle of the positioning projection 320 is the largest, that of the central failing projection 32 medium, and that of the front-most failing projection 32 the smallest. In other words, the included angles of those failing projections are set to have the following relationship in the figure; a>b>c.

Figure 6:
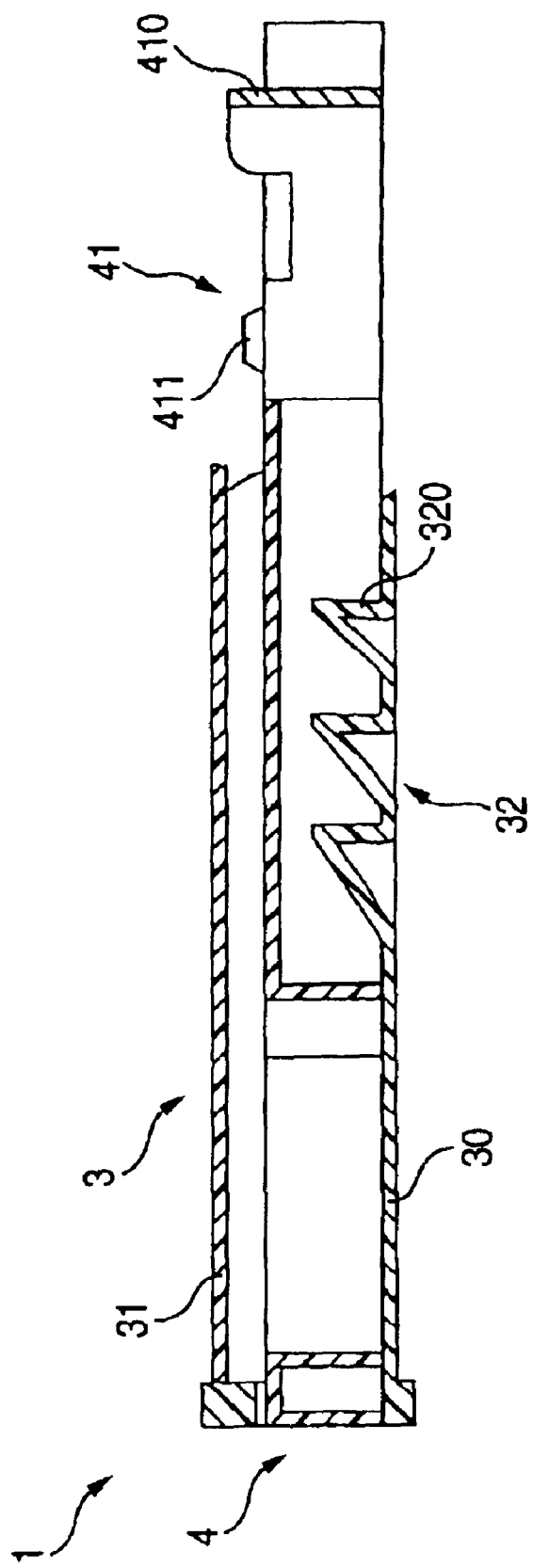
FIG. 6 is a longitudinal sectional view showing the vehicular drawer apparatus according to the first embodiment at a drawn-out position.

When the cup holder 4 is accommodated in the case 3, the passenger pushes a front end face of the cup holder 4 toward the rear. FIG. 6 shows a longitudinal sectional view of the vehicular drawer apparatus in which the cup holder 4 is at the accommodated position. As shown in the figure, at the accommodated position, the front end face of the cup holder 4 is disposed substantially flush with a front end face of the case 3. In addition, the stopper blade portion 410 is disposed spaced away to the rear from the positioning projection 320.

Note that switching positions of the cup holder 4 from the accommodated position to the drawn-out one is automatically implemented by a push-open mechanism (not shown) In addition, the cup holder 4 is locked at the accommodated position by a heart cam mechanism (not shown).

Figure 7:
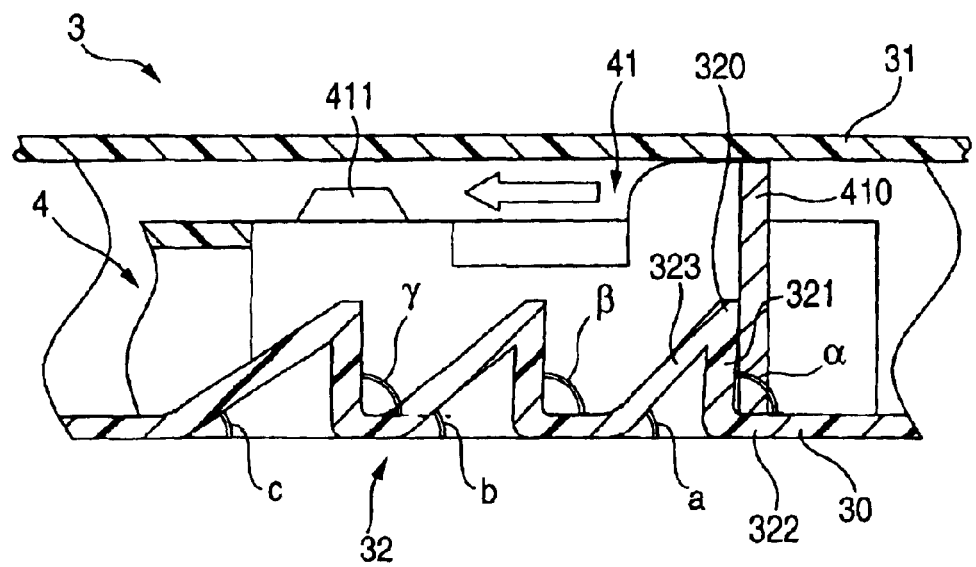
FIG. 7 is an enlarged view showing a striker and failing projections of the vehicular drawer apparatus according to the first embodiment which are located at the drawn-out position.

Described next will be the operation of the vehicular drawer apparatus according to the embodiment when an excessive large impact energy is applied to the cup holder in the drawn-out direction. When an impact energy is applied to the cup holder 4 in the drawn-out or forward direction, the cup holder moves to the drawn-out position within the case. FIG. 7 shows an enlarged view of the striker and the failing projections when the cup holder is at the drawn-out position. As shown, a front end face of the stopper blade portion 410 of the striker 41 abuts with a rear end face of the positioning projection 320 of the failing projections 32 or a rear end face of the erect wall 321.

Here, the included angle $\alpha$ between the erect wall 321 and the bottom wall 322 is set relatively small, as has been described before. Due to this, the front end face of the stopper blade portion 410 comes to abut with an upper end of the rear end face of the erect wall 321. Consequently, a relatively large bending moment is generated at a root portion of the erect wall 321, and due to this, the erect wall 321 is nearly made to fall forward by the stopper blade portion 410.

While the erect wall 321 is supported by the inclined wall 323 from the front, the included angle a between the inclined wall 323 and the bottom wall 322 is set relatively large. Due to this, the supporting force given to the erect wall 321 by the inclined wall 323 is small. Consequently, the erect wall 321 and the inclined wall 323 are made to fall forward with a relatively small impact. In other words, the positioning projection 320 buckles and fails by absorbing the relatively small impact energy.

Figure 8:
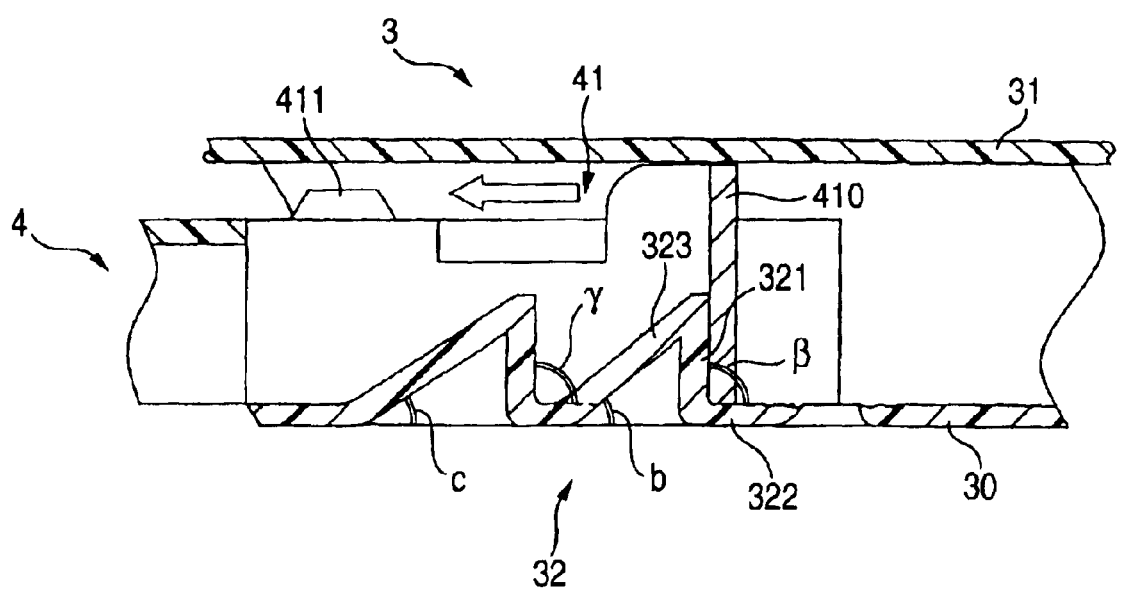
FIG. 8 is an enlarged view showing a state in which the striker abuts with the central failing projection in the vehicular drawer apparatus according to the first embodiment.

Having broken the positioning projection 320, the stopper blade portion 410 comes then to abutment with the failing projection 32 of the three failing projections 32 which is disposed at the center position. FIG. 8 is an enlarged view showing the striker and the failing projections. As shown in the figure, the front end face of the stopper blade portion 410 abuts with the rear end face of the erect wall 321. Here, the included angle $\beta$ between the erect wall 321 and the bottom wall 322 is set to be medium, as has been described before. Due to this, the front end face of the stopper blade portion 410 abuts with an upper half of the rear end face of the erect wall 321. Consequently, a bending moment which is medium in magnitude is generated at the roof portion of the erect wall 321. In addition, the included angle b between the inclined wall 323 and the bottom wall 322 is set to be medium, and due to this, the supporting force given to the erect wall 321 by the inclined wall 323 becomes medium.

Consequently, the positioning projection 320 is caused to buckle and fail by absorbing the medium impact energy.

Figure 9:
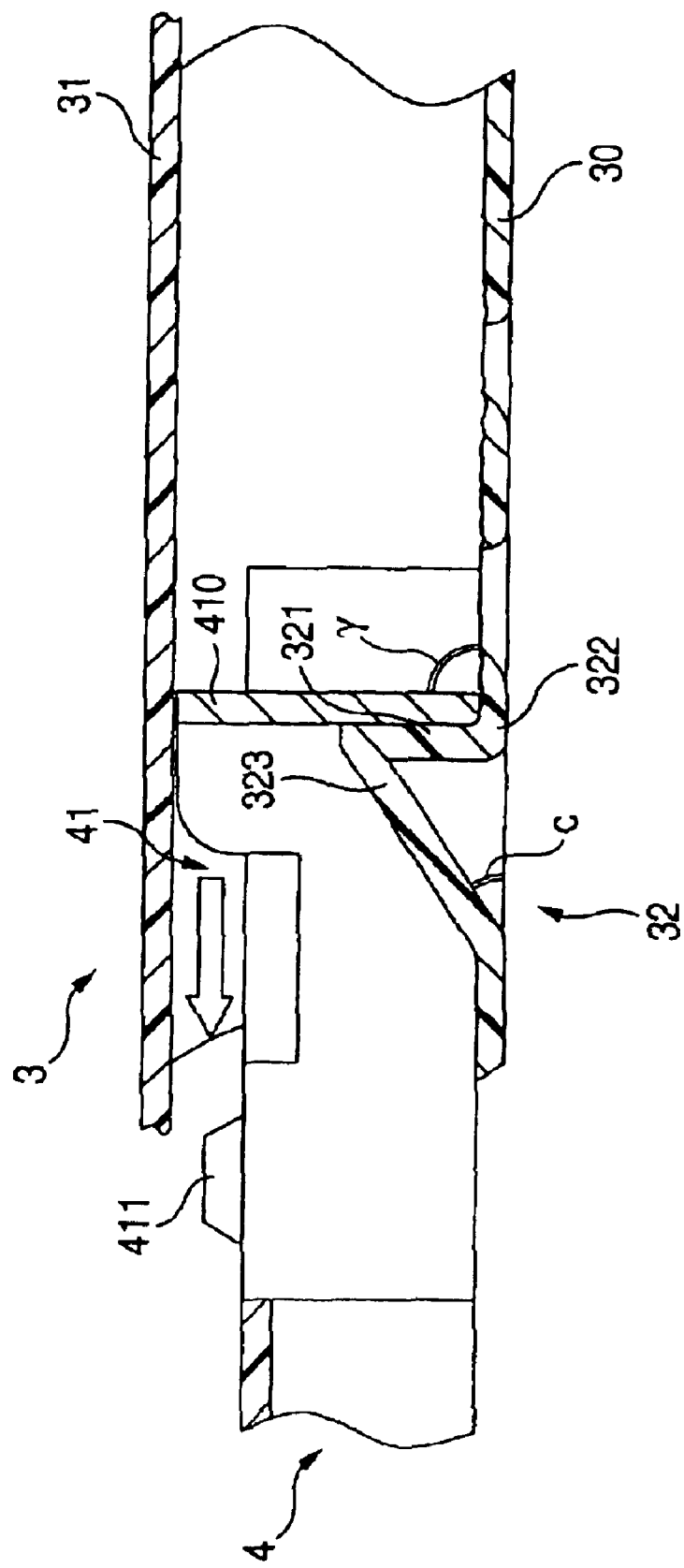
FIG. 9 is an enlarged view showing a state in which the striker abuts with the front-most failing projection in the vehicular drawer apparatus according to the first embodiment.

Having broken the central failing projection 32, the stopper blade portion 410 next comes to abut with the front-most failing projection 32 of the three failing projections 32. FIG. 9 is an enlarged view showing the striker and the failing projection in that state. As shown in the figure, the front end face of the stopper blade portion 410 abut with a rear end face of the erect wall 321. Here, the included angle γ between the erect wall 321 and the bottom wall 322 is set relatively large, as has been described before. Due to this, the front end face of the stopper blade portion 410 abuts fully with the rear end face of the erect wall 321. Consequently, a relatively small bending moment is generated at the roof portion of the erect wall 321. In addition, the included angle c between the inclined wall 323 and the bottom wall 322 is set relatively small. Due to this, the supporting force given to the erect wall 321 by the inclined wall 323 becomes relatively large, and therefore, the failing projection 32 is caused to buckle and fail by absorbing the relatively large impact energy.

Next, an advantage provided by the vehicular drawer apparatus according to the first embodiment will be described. The vehicular drawer apparatus according to the embodiment comprises the six failing projections 32 as the energy absorption device. The six failing projections 32 are caused to buckle and fail in a sequential manner to thereby absorb impact energy in a stepped manner. Due to this, according to the vehicular drawer apparatus 1 according to the embodiment, the whole of impact energy can be absorbed with the relatively simple construction. In addition, the individual failing projections 32 are not required to have the high strength. Consequently, the production costs of the vehicular drawer apparatus 1 according to the embodiment becomes low.

In addition, among the longitudinally arranged three failing projections 32, the failing projections disposed rear-most are made to function as the positioning projection 320. Due to this, the drawn-out position of the cup holder 4 can be determined without disposing separately a positioning member.

Additionally, the included angles between the erect walls 321 and the bottom walls 322 of the failing projections 32 are set so as to become; α<β<γ. In addition, the included angles between the inclined walls 323 and the bottom walls 322 are set so as to become; a>b>c. Due to this, among the three failing projections 32 arranged in the longitudinal direction, the failing projection that is easiest to buckle is the positioning projection 320. The failing projection 32 that is the second easiest to buckle is the central failing projection 32. The failing projection 32 that is the most difficult to buckle is the front-most failing projection 32. Thus, the failing projections 32 are disposed such that the absorbing amount of impact energy increases in a stepped manner from the early impact stage to the late impact stage. Consequently, according to the vehicular drawer apparatus 1 according to the embodiment, the cup holder 4 and the case 3 can be protected against impact.

(2) Second Embodiment

Figure 10:
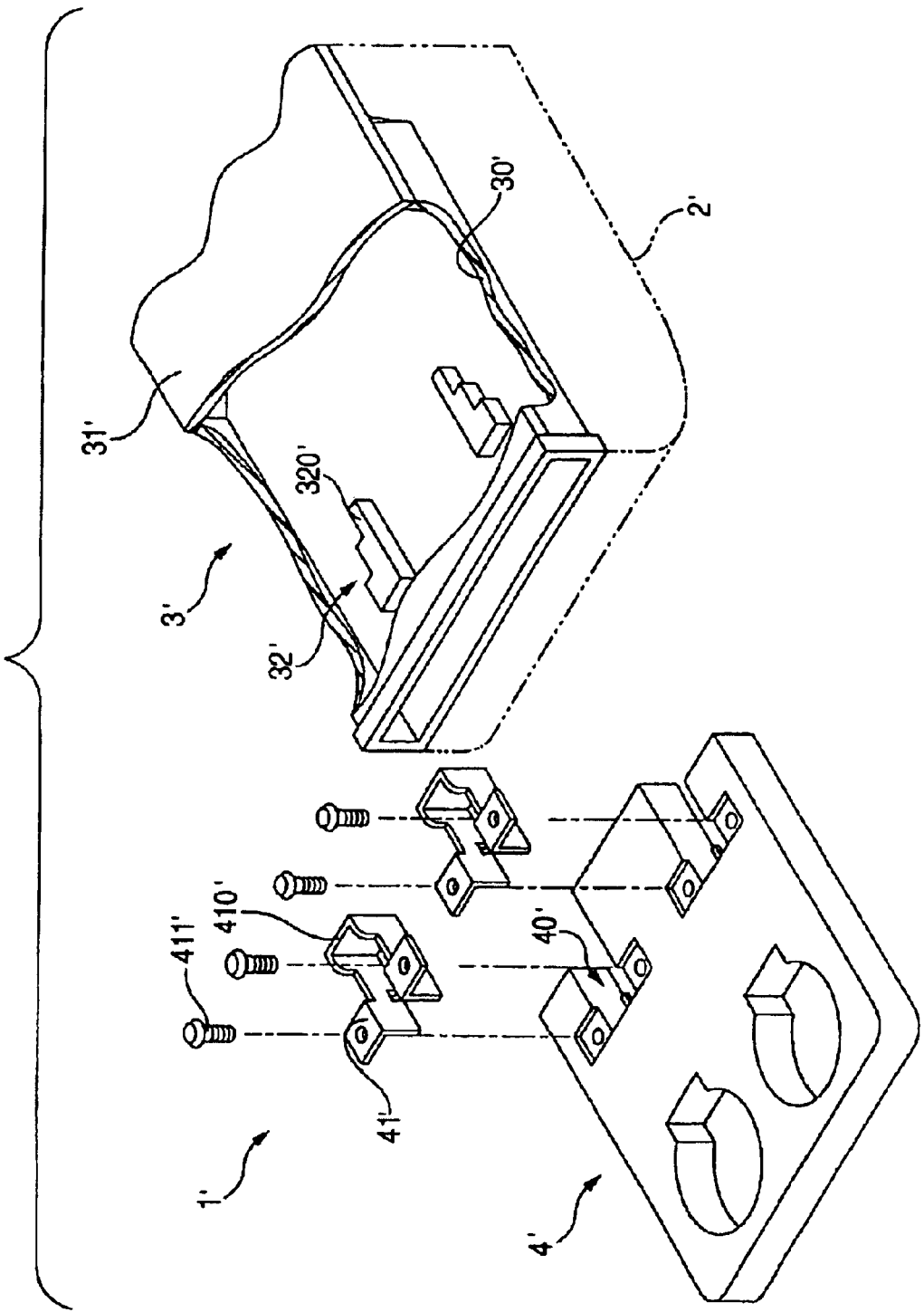
FIG. 10 is an exploded view of a vehicular drawer apparatus according to a second embodiment.

A second embodiment differs from the first embodiment in that failing projections are arranged which do not buckle but compress to fail. Consequently, only differences will be described here. An exploded view of a vehicle drawer apparatus according to the second embodiment is shown in FIG. 10. Note that like reference numerals are given to members like to those described in the first embodiment. However, the reference numerals in FIG. 10 include a single prime mark, which is not used in the following description, to indicate that FIG. 10 illustrates a different embodiment. As shown in the figure, failing projections 32 are formed in to a stepped shape pointing rearward. A positioning projection 320 is disposed at a final step of the failing projection 32.

When impact energy is applied, the last step of the failing projection 32 is first collapsed. Namely, the positioning projection 320 is collapsed. The positioning projection 320 collapses with a relatively small impact. Then, a central step of the failing projection 32 collapses. The central step collapses with a medium impact. Then, finally, a front-most step of the failing projection 32 collapses. The front-most step collapses with a relatively large impact. Thus, with the failing projection 32 according to the second embodiment, the absorbing amount of impact energy is set so as to increase gradually from the early impact stage to the late impact stage.

According to the vehicular drawer apparatus according to this embodiment, impact energy is absorbed when the failing projections 32 are collapsed. Due to this, the entirety of the failing projection 32 effectively functions as a crushable zone, and consequently, impact energy can be absorbed more effectively.

(3) Third Embodiment

Figure 11:
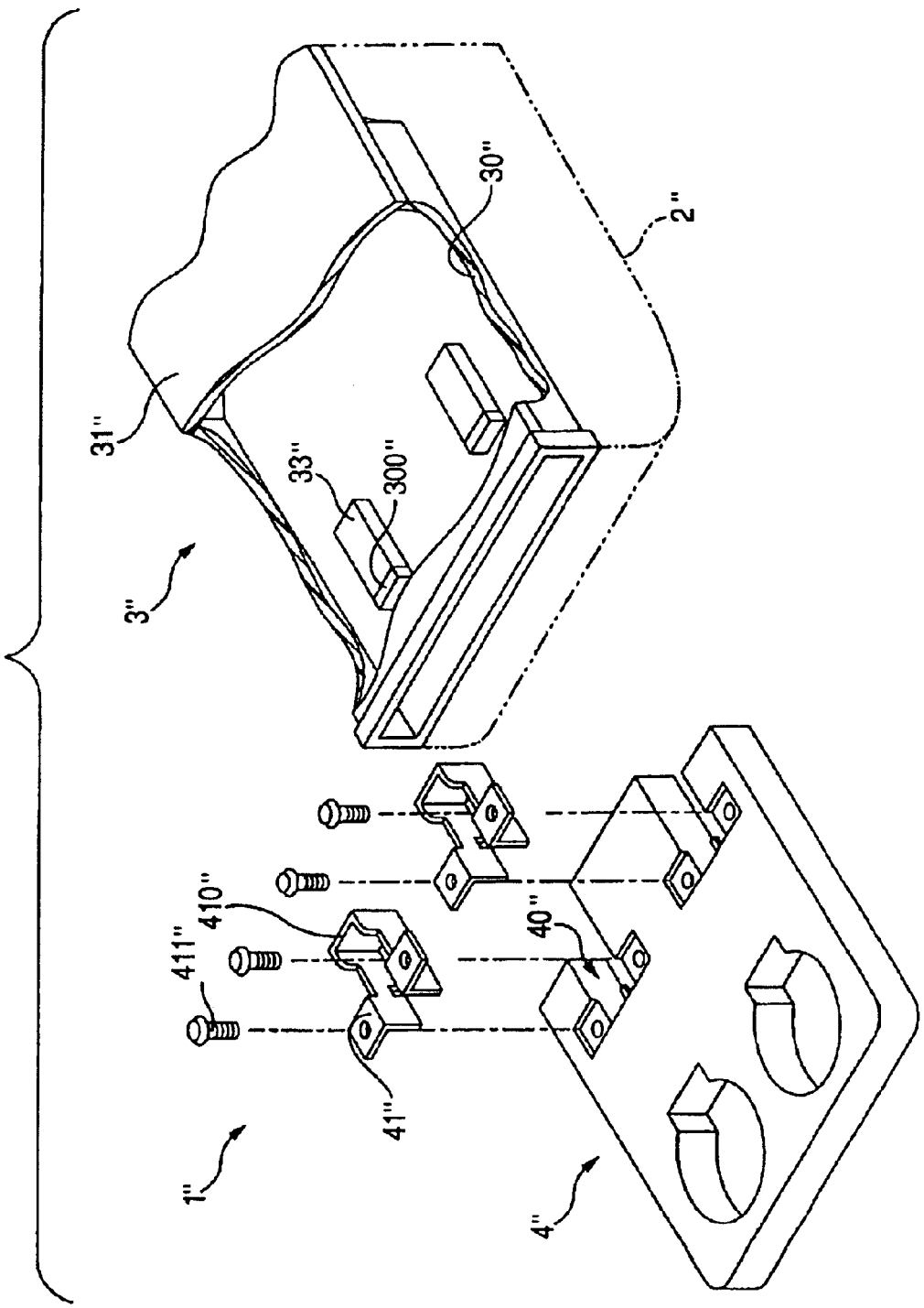
FIG. 11 is an exploded view of a vehicular drawer apparatus according to a third embodiment.
Figure 12:
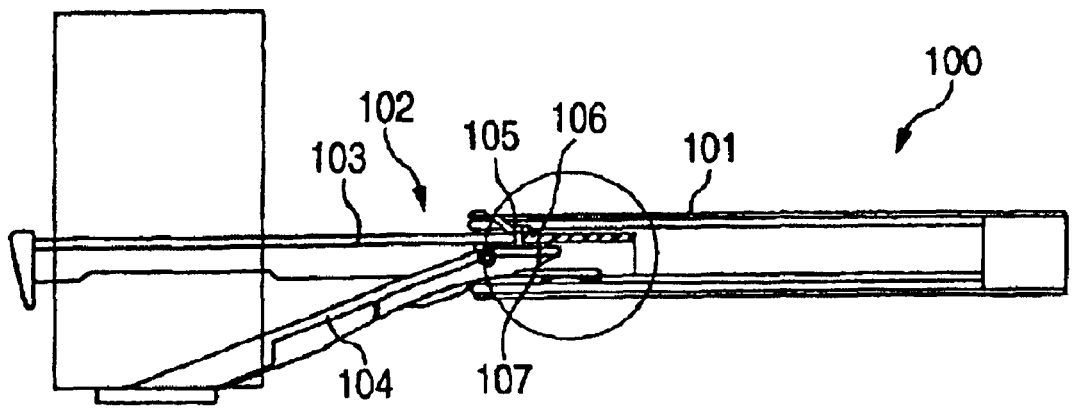
FIG. 12 is a longitudinal sectional view of a conventional vehicular drawer apparatus.
Figure 13:
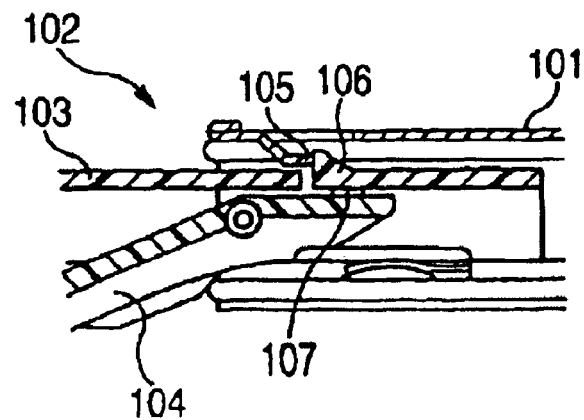
FIG. 13 is an enlarged view of a circled portion in FIG. 12.

A third embodiment differs from the first embodiment in that resilient members are disposed instead of the failing projections. Consequently, only differences will be described here. An exploded view of a vehicular drawer apparatus according to the third embodiment is shown in FIG. 11. Note that like reference numerals are given to members like to those described in the first embodiment. However, the reference numerals in FIG. 10 include a double prime mark, which is not used in the following description, to indicate that FIG. 10 illustrates a different embodiment. As shown in the figure, two ribs 300 are provided integrally on a bottom wall of a box portion 30 in such a manner as to protrude upwardly while being spaced away from each other in the transverse direction. The resilient member is made of foamed urethane and is formed into the shape When impact energy is applied, the resilient member 33 is pressed by a stopper blade portion of a striker 41 to thereby become pressed to deform gradually. Here, the deformation amount of the resilient member 33 is relatively large in an early impact stage is relatively small in a late impact stage. Due to this, the impact energy absorbing amount of the resilient member 33 of this embodiment gradually increases from the early impact stage to the late impact stage. According to the vehicular drawer apparatus according to the embodiment, impact energy can be absorbed in a stepped manner with the simple construction.

(4) Others

Thus, the embodiments of the vehicular drawer apparatus according to the invention have been described heretofore. However, embodiments of the inventions are not specifically limited to those described heretofore. Various modifications and improvements that could be implemented by those skilled in the art can be made.

For example, the location of the failing projections 32 and the resilient members 33 are not limited specifically, but the failing projections and resilient members may be disposed on at least one of the case 3 and the cup holder 4. In addition, the number, configuration and quality of material of the failing projections 32 and the resilient members 33 are not limited in particular. The number, configuration and quality of material may be determined depending upon the magnitude of impact energy that can be anticipated. In addition, in the above embodiments, while the cup holder 4 is described as being disposed as the drawer member, for example, a storage compartment for small things or a card holder may be disposed as the drawer member. In addition, while the case 3 is described as being disposed in the rear center arm rest, the case 3 may be disposed in, for example, the instrument panel, door panel or center console panel.

According to the invention, the vehicular drawer apparatus can be provided which can absorb energy even in the event an excessive impact energy is applied while no high strength is required.

What is claimed is:

1. A drawer apparatus adapted to be installed in a vehicle comprising: a case installed in an interior member of the vehicle and a drawer member disposed so as to slide in and out of said case; wherein at least one of said case and said drawer member has an energy absorption device for absorbing an impact energy applied to said drawer member in a drawing direction in which said drawer member is drawn out while said energy absorption device is deformed, wherein said energy absorption device is a graded energy absorption device which requires a small impact load to effect a deformation in an early impact stage and requires a large impact load to effect a deformation in a late impact stage.

2. A drawer apparatus as set forth in claim 1, wherein said energy absorption device is a buckling device for absorbing an impact energy through buckling failure.

3. A drawer apparatus as set forth in claim 1, wherein said energy absorption device is a crushing device for absorbing an impact energy through compression failure.

4. A drawer apparatus as set forth in claim 1, wherein said energy absorption device is a plurality of projections disposed in said case; wherein said drawer member has a striker which is opposed to said projections in the drawing direction, and when an impact energy is applied to said drawer member, said striker causes said projections to fail sequentially so that said impact energy applied to said drawer member is absorbed in a stepped manner.

5. A drawer apparatus as set forth in claim 4, wherein the projection that is the closest to said striker among said plurality of projections is served to determine a drawn-out position of said drawer member.

6. A drawer apparatus as set forth in claim 1, wherein said energy absorption device is a plurality of projections disposed in said case, said projections having a form of a triangle which points forward with respect to the case and being aligned in the drawing direction on said case.

7. A drawer apparatus as set forth in claim 6, wherein an angle formed between an erect wall of one of the projections and a bottom wall of the case is smaller than an angle formed between another erect wall which is formed on a backward side of the case with respect to said one projection and the bottom wall.

* * * * *